(12) United States Patent
Smith

(10) Patent No.: US 12,725,217 B1
(45) Date of Patent: Sep. 1, 2026

(54) SYSTEMS AND METHODS FOR VERIFYING THE AUTHENTICITY OF DOCUMENTS

(71) Applicant: UIPCO, LLC, San Antonio, TX (US)

(72) Inventor: Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 502 days.

(21) Appl. No.: 18/319,051

(22) Filed: May 17, 2023

Related U.S. Application Data

(63) Continuation of application No. 16/817,277, filed on Mar. 12, 2020, now Pat. No. 11,756,147.

(60) Provisional application No. 62/824,509, filed on Mar. 27, 2019.

(51) Int. Cl.

| | |
|---|---|
| ***G06T 1/00*** | (2006.01) |
| ***G06F 21/31*** | (2013.01) |
| ***G06Q 10/10*** | (2023.01) |
| ***G06Q 20/04*** | (2012.01) |
| ***G06Q 20/10*** | (2012.01) |
| ***G06Q 20/40*** | (2012.01) |
| ***G06V 30/14*** | (2022.01) |
| ***G06V 40/16*** | (2022.01) |
| ***H04N 1/32*** | (2006.01) |

(52) U.S. Cl.
CPC ............ *G06T 1/0021* (2013.01); *G06F 21/31* (2013.01); *G06Q 10/10* (2013.01); *G06Q 20/042* (2013.01); *G06Q 20/1085* (2013.01); *G06Q 20/4012* (2013.01); *G06Q 20/40145* (2013.01); *G06V 30/1448* (2022.01); *G06V 40/172* (2022.01); *H04N 1/32149* (2013.01)

(58) Field of Classification Search
USPC .......................................................... 382/118
See application file for complete search history.

(56) References Cited

U.S. PATENT DOCUMENTS

| | | | | |
|---|---|---|---|---|
| 6,785,814 B1 * | 8/2004 | Usami | H04N 1/32144 | 380/54 |
| 11,756,147 B1 * | 9/2023 | Smith | G06T 1/0021 | 705/45 |
| 2010/0198733 A1 * | 8/2010 | Gantman | G06Q 20/326 | 705/64 |
| 2011/0101109 A1 * | 5/2011 | Bona | G06Q 20/4016 | 235/492 |
| 2015/0332128 A1 * | 11/2015 | Sadovsky | G06V 30/40 | 382/182 |
| 2019/0303446 A1 * | 10/2019 | Franz | G06F 40/274 | |

* cited by examiner

*Primary Examiner* — Jacky X Zheng
(74) *Attorney, Agent, or Firm* — Plumsea Law Group, LLC

(57) ABSTRACT

A system and method for ensuring the authenticity of imaged documents by embedding data into the images of such documents. The embedded data can then be extracted and decoded, and used to determine whether a particular document may be fraudulent. The documents may be checks, money orders, contracts, invoices, titles or other legal documents that may need to have their authenticity confirmed to prevent, for example, forged or otherwise false documents from being accepted as genuine.

5 Claims, 9 Drawing Sheets

SYSTEMS AND METHODS FOR VERIFYING THE AUTHENTICITY OF DOCUMENTS

CROSS-REFERENCE TO RELATED APPLICATIONS

This application is a Continuation of Smith, U.S. Pat. No. 11,756,147, issued on Sep. 12, 2023, and titled "Systems and Methods for Verifying the Authenticity of Documents," which application claimed the benefit of U.S. Provisional Patent Application Ser. No. 62/824,509 filed Mar. 27, 2019, and titled "Systems and Methods for Verifying the Authenticity of Documents." The disclosures of every application listed above are incorporated by reference in their entirety for all purposes.

TECHNICAL FIELD

This disclosure relates generally to systems and methods for embedding data into documents and verifying that data to ensure the authenticity of the documents.

BACKGROUND

In many cases, institutions need to verify the authenticity of documents submitted to those institutions to detect whether any documents submitted to those institutions may be fraudulent. For example, banks generally need to ensure the authenticity of checks submitted electronically or as paper checks to the banks for payment. Institutions such as companies issuing checks to their employees or to their vendors, or insurance companies issuing checks for payments of claims filed by their insured claimants also need to prevent payment of fraudulent checks. For example, as electronic images of checks are transmitted between various institutions within the banking system, it might be possible for a malicious actor to develop ways for inserting a fraudulent check into the stream of checks being processed. The sheer volume of checks being processed might allow such a fraudulent check to escape scrutiny and be paid. These issues may apply whether the checks are issued in paper form or in electronic form. Also, these issues may apply to checks that were originally issued as paper checks but are then recorded as electronic images within the banking system. In addition to checks, other documents such as money orders, contracts, invoices, titles or other legal documents need to be authenticated during the normal course of business.

For these reasons, there is a need for systems and methods that prevent the use of fraudulent documents by third parties intent on using those documents to defraud persons, banks, companies or other institutions.

SUMMARY

In one aspect, embodiments include a method for authenticating an image of a document by retrieving or generating authentication data to be embedded in the document image. The authentication data is associated with the document and then embedded into an image of the document to produce a document with embedded authentication data. The image of the document with the embedded authentication data is then transmitted to a server which has an application that is configured to extract the embedded authentication data from the document, compare the extracted authentication data to stored data, and approve the document if the extracted authenticated data matches the stored data.

In another aspect, embodiments include a method for authenticating an electronic document by obtaining the electronic document, and obtaining authentication data. The authentication data is then embedded into the electronic document. The electronic document containing the embedded authentication data is then transmitted to a remote server, where an application on the remote server then extracts the authentication data from the electronic document, and determines the authenticity of the electronic document.

In a further aspect, embodiments include a method for minimizing risk that includes receiving an electronic document to be authenticated, extracting authentication data from the electronic document, comparing the authentication data to one of previously stored data and concurrently obtained data, and determining whether the electronic document is authentic.

Other systems, methods, features and advantages of the embodiments disclosed herein will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the systems and methods disclosed herein. Moreover, in the drawings, like reference numerals designate corresponding parts throughout the drawings.

DESCRIPTION OF EMBODIMENTS

The embodiments disclosed herein provide systems and methods for ensuring the authenticity of documents by embedding data into the images of such documents. The embedded data can then be extracted and decoded, and used to determine whether a particular document may be fraudulent. The embodiments will be described herein primarily with reference to insurance companies and banks, but these embodiments are broadly applicable to any documents that are exchanged between parties and whose authenticity needs to be established. In addition to checks, documents such as money orders, contracts, invoices, titles or other legal documents may need to have their authenticity confirmed to prevent, for example, forged or otherwise false documents being accepted as genuine.

The data being embedded into images of documents such as checks and the other documents listed above may include, for example, geolocation data (such as a GPS location or a physical address), a VIP code with a time limit (a VIP code is a code-often a numeric code—that is transmitted to a device held or viewed by a user and that is only valid for a short period, such as 30 seconds or a few minutes), a device MAC address, an IP address, biometric data (such as a fingerprint, a retina scan, DNA data, a voice recording, or a face image), data relating to the image of the document itself (such as the dimensions of the image), the transaction count, historical activity (volume and frequency of deposits or withdrawals), other images (photos taken by an onboard camera or smart glasses), audio data and video data. The considerations involved in determining which types of data to use will be discussed below.

The processes described below could be done in real time for one or a batch of checks, or could be done periodically in batches. For example, they could be done once an hour or once a day for a batch of checks. They could be done one check image at a time, or a thousand check images at a time.

Figure 1:
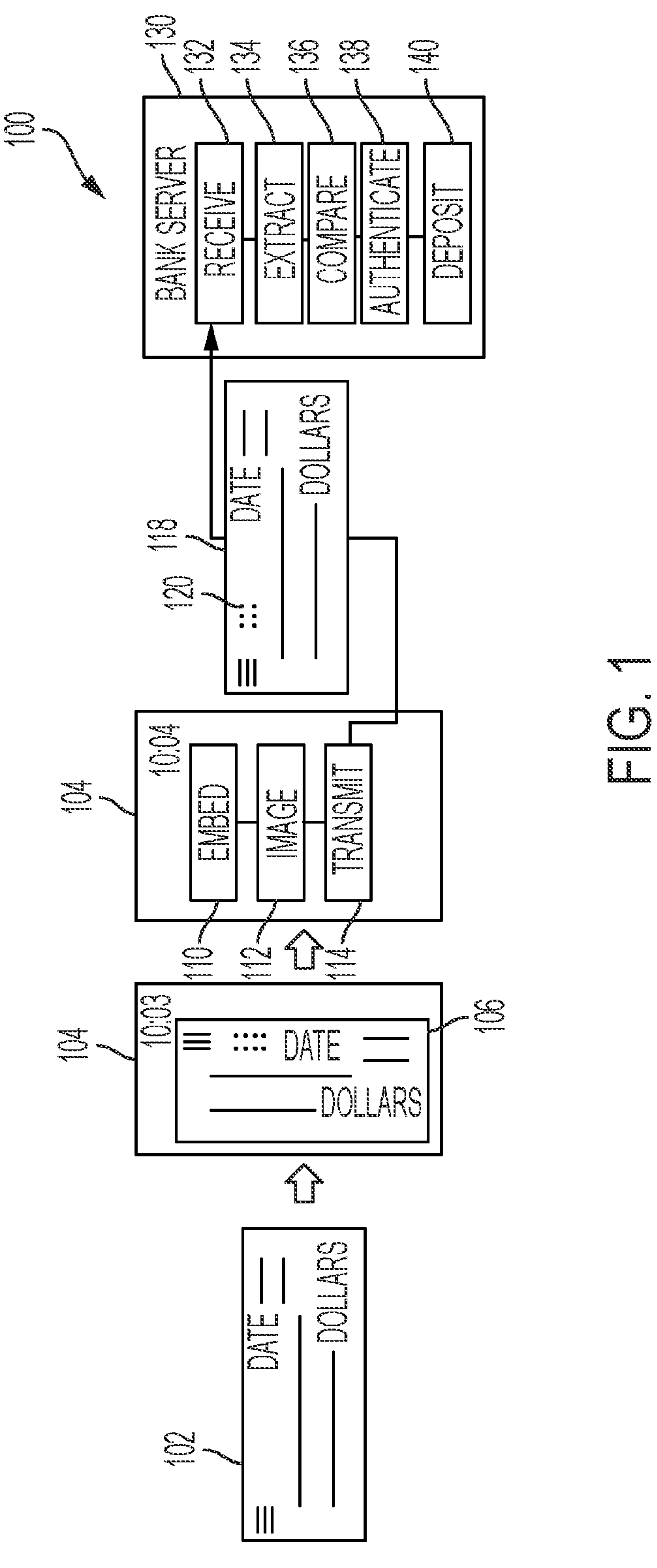
FIG. 1 is a schematic block diagram showing a system and method for depositing checks using a device, according to an embodiment.
Figure 2:
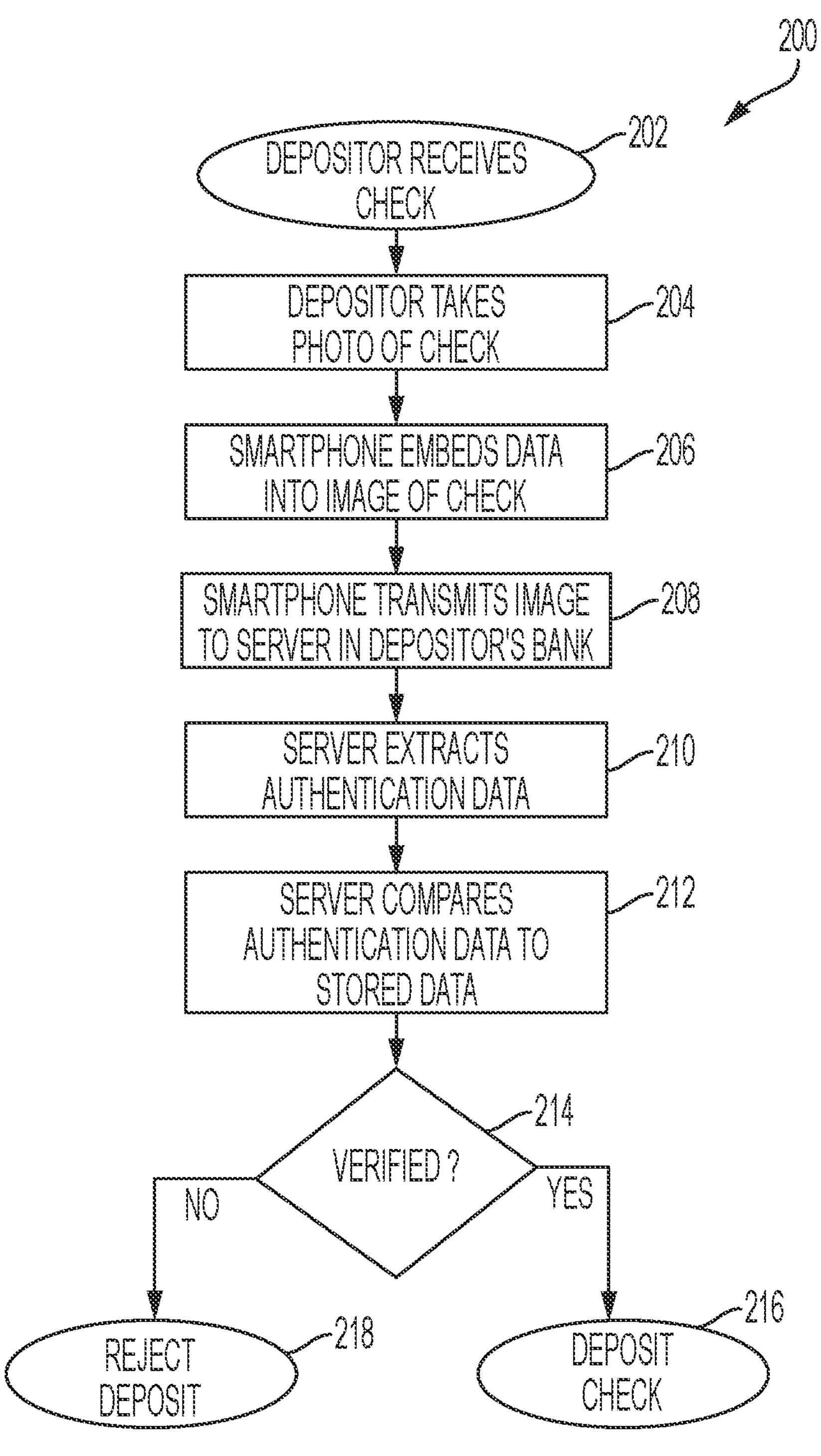
FIG. 2 is an exemplary flow chart showing steps that may be taken to execute the depositing process illustrated in FIG. 1.
Figure 3:
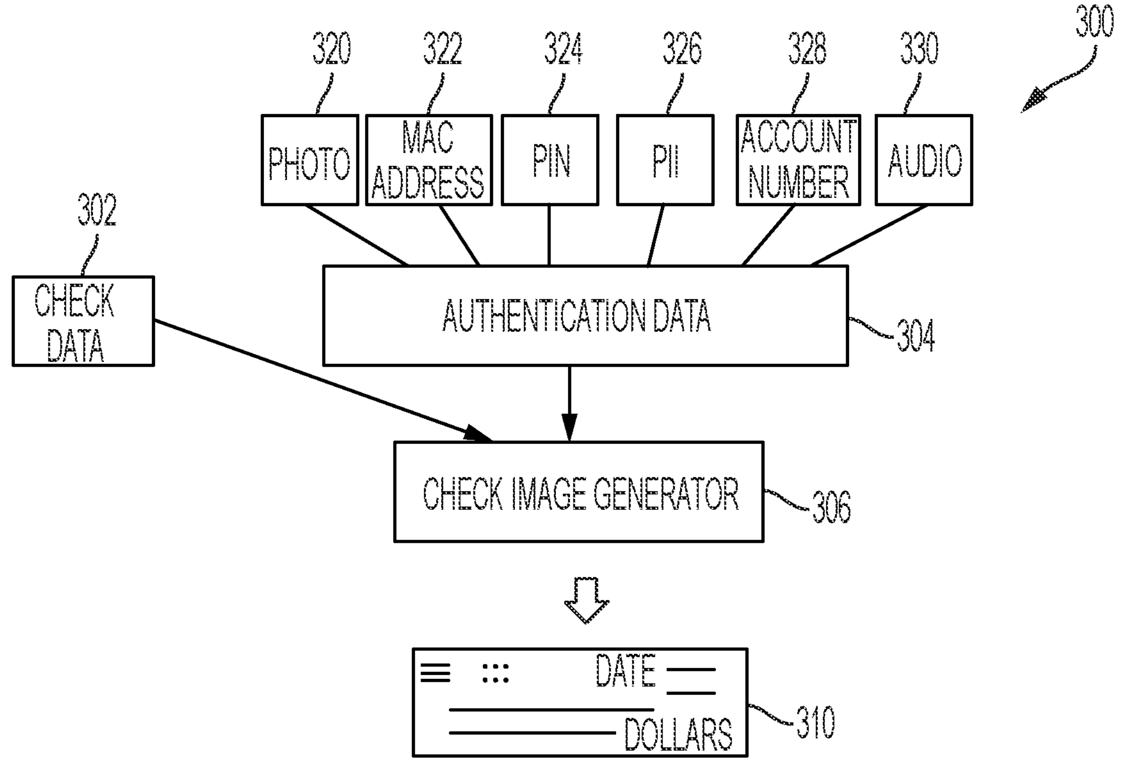
FIG. 3 is a schematic diagram illustrating the types of authentication data that may be embedded in a check image, according to an embodiment.

An exemplary system and method for authenticating checks deposited using a mobile device is shown in FIG. 1, FIG. 2 and FIG. 3. FIG. 1 is a block diagram illustrating a system for ensuring the authenticity of checks deposited electronically using a mobile device. FIG. 2 is an exemplary flowchart showing steps that may be taken to execute the depositing and authentication process. FIG. 3 is a schematic diagram illustrating different types of data that may be embedded in a check image as a check is being deposited at an ATM. As shown in FIG. 1, a depositor may make an image of a check 102 and record the image 106 of check 102 on her smartphone 104 at, for example, 10:03 am. A moment later, at 10:04 am for example, an embed app 110 on the depositor's smartphone 104 embeds data onto the image of check 102 which was stored in image repository 112. The data may be, in this example, the smartphone's MAC address. Other possible categories of data are described below with reference to FIG. 3.

A transmit module 114 sends that image 118 with the embedded data 120 to a receiving module 132 in the depositor's bank's server 130. The image 118 and embedded data 120 may be sent to bank server 130 using any kind of network. Exemplary networks include the Internet, a telephone network, a cable network, a wireless network, or some other technology for the tethered or wireless transmission of electronic data.

The receiving bank's server 130 sends image 118 to an extraction module 134, which extracts the authentication data (in this example, the depositor's smartphone's MAC address), and compares the authentication data to previously stored authentication data (in this example, the previously stored MAC address of the depositor's smartphone) in comparison module 136. If the two sets of authentication data match, authentication module 138 authenticates the check and deposit module 140 approves the check for deposit.

Although the exemplary embodiment depicts the use of a smartphone for taking photos of checks and embedding authentication data into the resulting images, other types of devices could be used in other embodiments. For example, in another embodiment a customer could use a tablet, a laptop, or other mobile computing device. In some cases, a desktop computer with a camera could also be used.

The flowchart in FIG. 2 starts in step 202 when a check is issued by a company and received by a depositor. In step 204 the depositor takes a photo of the check (or a photo of the front of the check and a photo of the back of the check). In step 206, the embed app 110 on the depositor's smartphone embeds data 120 into the image of the check. In executing step 206, the process may determine where in the image to embed the data. The data may be embedded at the start of the image or at the end of the image. It may be embedded at a fixed displacement from the start or end of the image. It may also be embedded in a discontinuous manner. For example, the data may be embedded with predetermined gaps in the data at predetermined regular or irregular intervals.

In step 208, smartphone 104 transmits the check image 118 with its embedded data to the depositor's bank. The depositor's bank's server extracts the authentication data from the check image 118 in step 210. In step 212, the depositor's bank's server compares the extracted data to the authentication data stored in the server. In step 214, the depositor's bank's server determines whether the authenticity of the check has been verified in step 212. If the authenticity has been verified, the bank server authorizes deposit of the check in step 216. If the authenticity of the check has not been verified, the server rejects the deposit in step 218.

In some cases, for example when the person depositing the check does not have an account with the payor bank, the smartphone may be in communication with the payor bank. The communication may be over the telephone network, over a cable network, over the Internet or over some other means of wired or wireless communication. The smartphone could transmit the check data to the payor bank and request authentication data. The payor bank may then transmit authentication data over a telephone network, over the Internet or over another telecommunication medium or network to the smartphone. The smartphone could then embed that authentication data into the check image. In that case, the comparison in step 212 is with the authentication data received from the payor bank.

FIG. 3 is a block diagram 300 showing how an image of an electronic check may be created to include both the check data 302 itself (payer, payee, date, amount, memo, etc.) and authentication data 304. The authentication data 304 may include, for example, one or more of a photo 320 of the depositor, the MAC address of the smartphone 322, a depositor's personal identification number (PIN) 324, a depositor's personally identifying information (PII) 326 (such as the name of the depositor's maternal grandfather, for example), several digits from the depositor's savings account number 328 and an audio recording 330 of the depositor saying a previously-stored phrase. In addition to the categories of data shown in FIG. 3, other categories of data may be used as authentication data, such as face recognition data, voice recognition data, an alphanumeric VIP code with or without a time limit, DNA data, a transaction count, and/or geolocation data. Also, combinations of any of the above may be used, sometimes by combining them serially, sometimes by combining them according to a mathematical or procedural algorithm. This data may have previously been stored in a server at the depositor's bank, for example. The authentication data 304 is then embedded into an image of the company's check containing the check data 302 by check image generator 306, thus creating electronic check image 310. A copy of the check image 310 may then be sent to a payee bank (not shown in FIG. 3), and the electronic check image and the embedded data may be stored in the payee bank's server, for example.

Figure 4:
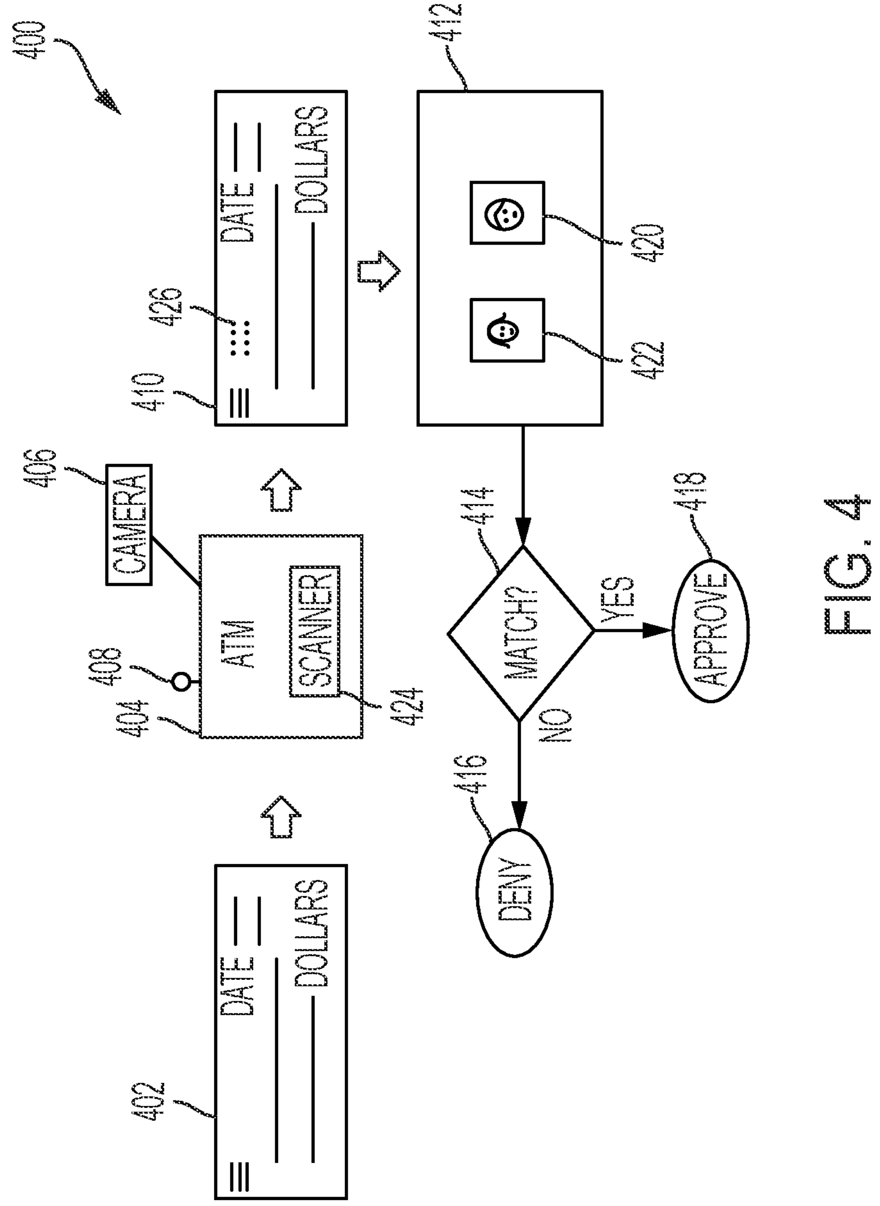
FIG. 4 is a schematic diagram showing an exemplary system for detecting a possibly fraudulent transaction at an ATM.

FIG. 4 is a schematic block diagram of an embodiment 400 showing an example of a system for detecting a possibly fraudulent transaction at an ATM 404. A person submits a check 402 at an ATM for deposit into a bank account. The check is to be paid by a remote payor bank, which is not associated with ATM 404. ATM 404 has a video or still camera 406 and an audio recorder 408. After the check has been scanned by ATM scanner 424 in ATM 404 to generate an electronic image of the check, ATM 404 embeds authentication data into the electronic image. In this example, that embedded authentication data is an image of the person depositing the check at ATM 404. In other cases, the ATM 404 may embed, for example, its MAC address or its geolocation, for example. Thus, ATM 404 generates an electronic image 410 of check 402 with its embedded authentication data 426, in this case authentication data representing an image of the person depositing the check. The electronic image 410 of check 402 with its embedded authentication data 426 is then transmitted over the Internet, a telephone network, cable, or other wired or wireless transmission media to the remote payor bank. A server 412 in the remote payor bank generates the image 420 of the person depositing the check from the authentication data. A comparison app 414 compares image 420 to a previously stored photo or image 422 of the account holder. If the two do not match, comparison app 414 issues an order 416 denying payment. If the two do match, comparison app 414 issues an order 418 approving payment. In some cases, the remote payor bank may store facial recognition data instead of a photo or image of the depositor, and the comparison would be made using a facial recognition app.

Although not illustrated in FIG. 4, other authentication data may be used in conjunction with a deposit at an ATM that is remote from and not associated with the payor bank. For example, the geolocation of the ATM may be embedded in the electronic image of the check. The geolocation may be based upon the U.S. GPS system, the Russian GLONASS system, a combination of both, or another geolocation system such as a WiFi triangulation. If, for example, the ATM is located in Italy, and the person ostensibly submitting the check lives in Indiana, the payor bank may call the account holder at her home or on her cell phone to determine if she is visiting Italy. If audio data has been embedded in the check, it may also be checked against the account holder. For example, if the recording is of persons speaking Italian, and the account holder lives in Indiana, the payor bank may again call the account holder to make sure she is actually in Italy, not in Indiana. Alternatively, the ATM may ask the depositor to speak a standard phrase. That phrase may be recorded and sent to the payor bank for comparison to a stored audio recording or for voice recognition analysis and comparison to voice recognition data. As another example, if the background captured by a video camera at the ATM shows shop signs in Italian, the payor bank may want to confirm that its account holder is actually depositing a check in Italy.

Figure 5:
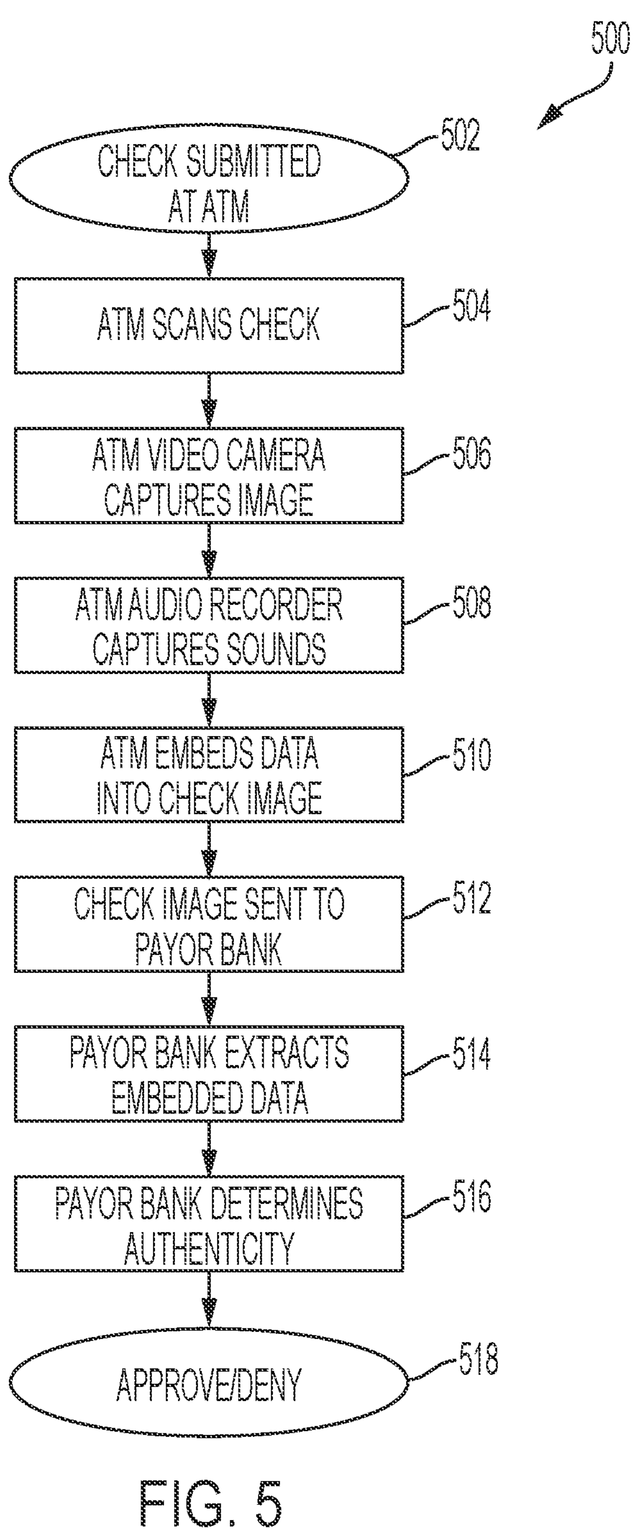
FIG. 5 is a flowchart outlining steps that may be taken to determine whether a check deposited at an ATM may be fraudulent, according to an embodiment.

The process used by the systems shown in FIG. 4 is illustrated in the flowchart 500 shown in FIG. 5. After a check is submitted to an ATM 404 in step 502, ATM scanner 424 scans the check in step 504. In step 506 the ATM captures an image (for example a photo or a video image) of the person depositing the check. In step 508, the ATM may also or alternatively record audio data, as discussed above. In step 510 the ATM embeds the image of the person depositing the check and sends the check image with the embedded authentication image data to the payor bank in step 512. The payor bank extracts the embedded authentication image data from the check image in step 514, compares the embedded image to a stored photo or image of the account holder to determine authenticity in step 516, and then approves or denies payment in step 518. A similar extraction and comparison process may be carried out if audio recordings are used instead of images.

Figure 6:
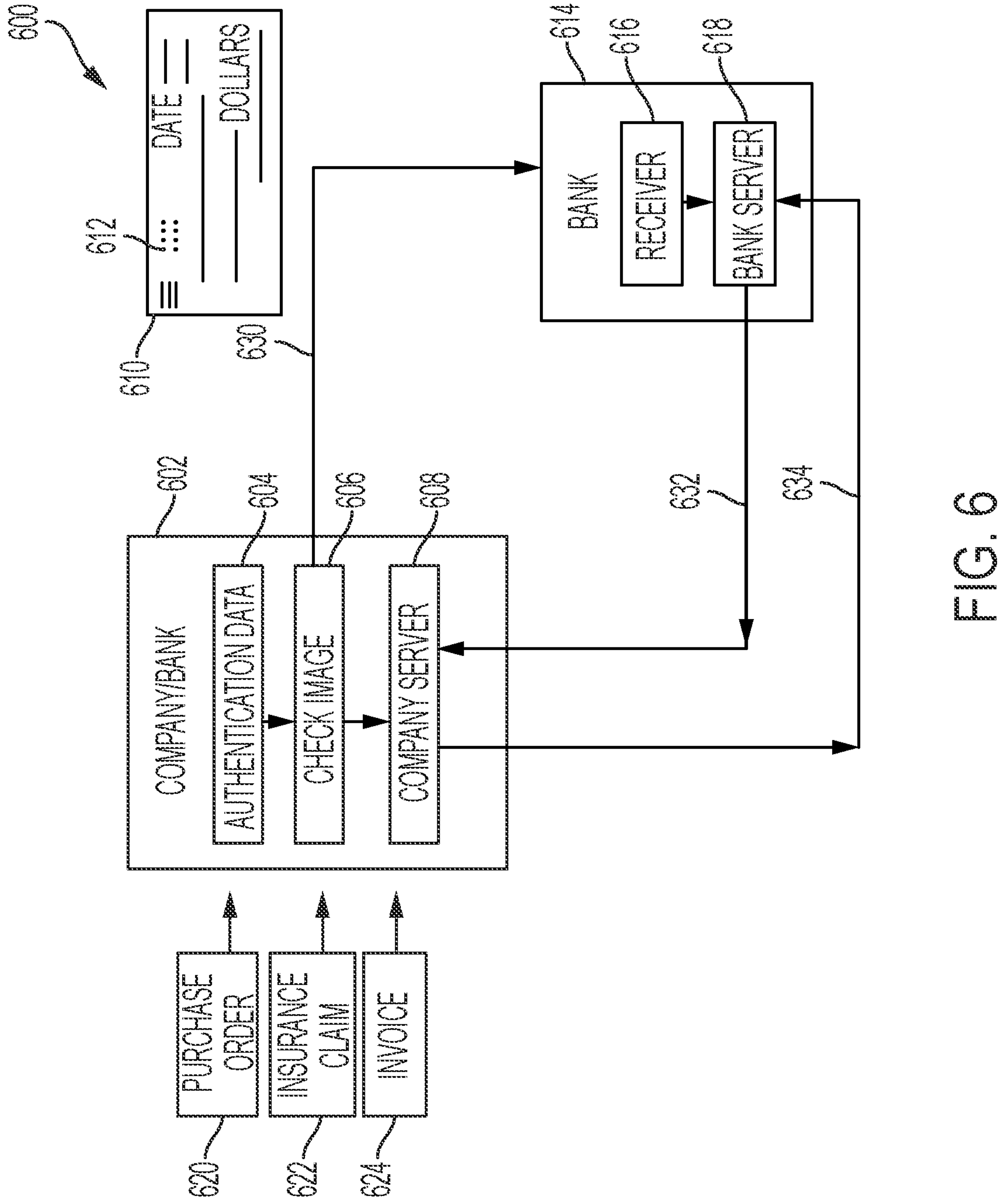
FIG. 6 is a block diagram illustrating an exemplary sequence for authenticating a check by embedding data into the image of a check.

FIG. 6 is a block diagram 600 that illustrates a typical sequence of events that take place when a check request is received and a company, bank, other institution or a person decides to embed authentication data into the electronic image of a check. In the example illustrated in FIG. 6, a company or bank 602 receives a request to issue a check. For example, because it must honor a purchase order 620, because it is an insurance company that has determined that it should pay for an insurance claim 622, or because it has received an invoice 624 for payment. The company or bank embeds authentication data 604 into the image 606 of a check, thus creating a new check image 610. The company or bank then sends the check image 610 with its embedded data 612 electronically over communication medium 630 for deposit in the payee's bank 614. The company or bank may also store the check image and the authentication data in the company server 608. Payee bank 614 stores the check image in a check receiver module 616, then extracts the embedded data and stores that data in the payee bank's server 618. Payee bank 614 then sends the embedded data back to the company server 608 for verification over communication medium 632. The company server 608 then responds to verify the authenticity of the check or to deny payment over communication medium 634. Communication medium 630, communication medium 632 and communication medium 634 may be, for example, the Internet, a telephone network, a cable network, a wireless network, or some other technology for the wired or wireless transmission of electronic data.

The embodiment described with reference to FIG. 6 is a description of embedding authentication data into an electronic image of a check. However, in another embodiment, the authentication data may be printed onto a paper check, for example. In that case, the authentication data would not be readily discernable through visual inspection, but could be detected and read from an electronic image of the paper check when that electronic image is generated. In still another embodiment, the authentication data is read directly from the paper check by a scanner configured to identify and read such authentication data.

Figure 7:
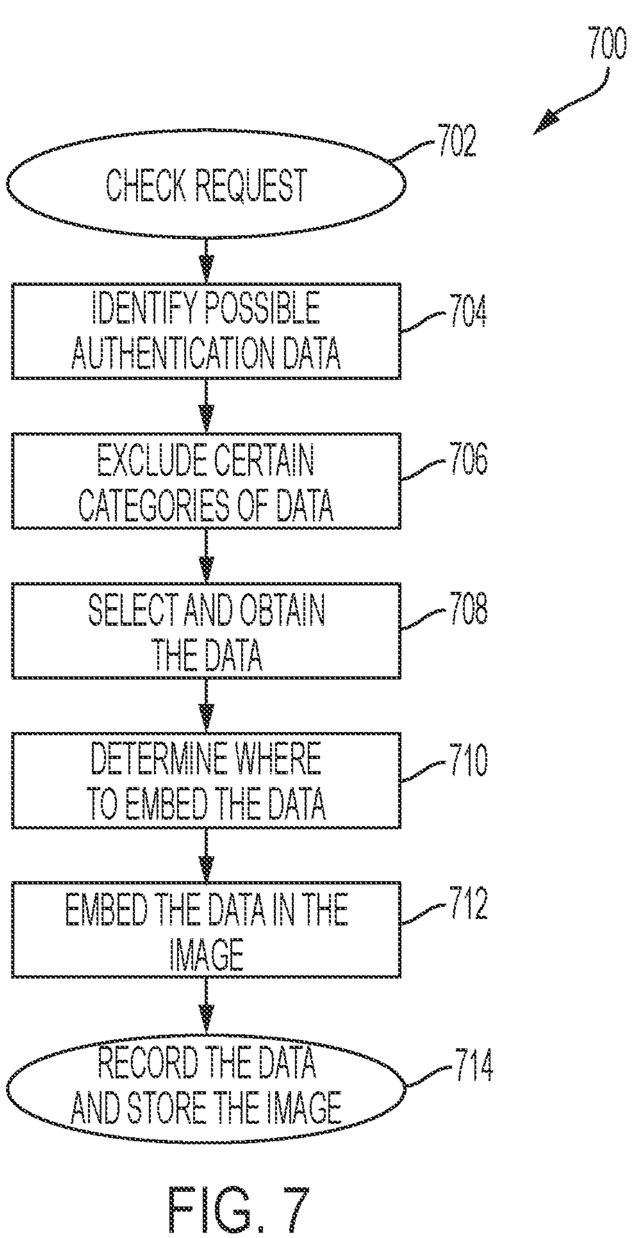
FIG. 7 is a flowchart showing steps that could be taken to embed authentication data into a check image, according to an embodiment.

FIG. 7 is a flowchart 700 showing the steps taken to embed authentication data into an image of a check. The process starts at step 702 when a company or other institution or a person having the necessary equipment receives a check request. In step 704, the process identifies authentication data that might possibly be used. In principle, such data might include, for example, data that might be considered to be reliable and therefore might be used with a reasonable degree of confidence such as the geolocation data, a MAC address, an IP address, biometric data, image length, transaction count, historic activity such as volume or frequency of transactions by the user, photos, audio recordings, images taken by an onboard camera or by smart glasses and video data. Other data that might be considered somewhat unreliable for authentication purposes (and might therefore be excluded) might include data that has been compromised (for example by a hacking event); data that is predictable or might be guessed such birthdates, home addresses or pet names; publicly available data such as colleges attended, hometowns, license plate numbers, historical dates, old addresses or telephone numbers, or the date of a home purchase; data that may have been published on Facebook or some other form of social media; data that is not sufficiently precise or accurate (e.g., amount of the last rainfall over 1 inch, or a temperature of 72 degrees instead of 72.45 degrees, for example); volatile data (such as the S&P 500 index); or simply data that is too large to be conveniently included at reasonable cost in time and money in the check image.

Data may also be considered unreliable because it is too old. For example, an address that is two years old may be out of date, and a house value that is six months old is most likely out of date. Also, the number of persons living in a household may change due to births, deaths, people moving in or people moving out.

Certain categories of data are dynamic, because they change over time. For example, many IP addresses are dynamic, because they may change as the device with the IP address (for example, a smartphone, a laptop, or a tablet) moves to a different location or different WiFi network. Another type of dynamic data is the user's smartphone's physical location. Also, certain kinds of dynamic data may be ascertainable at the same time by separate entities that are not in communication with each other. For example, two separate institutions could know, without being in communication with each other, the value of the S&P 500 index at COB the previous day, the price of a certain stock at COB the previous day, the score from the most recent local sports game, yesterday's temperature at the local airport or even at a remote airport, the times of high tide at a certain beach, and so on. Mathematical algorithms (which could change frequently) could be applied to such dynamic data to generate authentication data that are more difficult for a fraudulent actor to decipher. For example, a simple algorithm might be to take a trigonometric function or a cube root of whatever number (S&P 500 index, temperature, etc.) is used as the basis for the authentication data to calculate the actual authentication data. Such dynamic data might be selected for transactions with a relatively high degree of risk, such as the deposit of a check for $100,000 dollars.

The data to be embedded may be a combination of any two or more sets of data, which may be multiplied, divided, concatenated or combined in some other manner with each other. In some cases, it may be useful to embed the data redundantly, to provide a backup in case a part of the check image is corrupted.

VIP codes may also be used, although these VIP codes are often only valid for a limited time, such as 60 seconds or 24 hours, for example, and thus may be considered to be volatile data. So, if a VIP code is used, it must be used in a system that allows verification of authenticity within the lifetime of the VIP code. An IP address is another example of a volatile code that must be used within an appropriate amount of time given its volatility.

In step 706, unreliable categories of data may be excluded, in some cases depending upon the degree of risk. For example, when identifying authentication data to be used when issuing a $100,000 check, authentication data with a higher degree of security may be used compared to selecting authentication data for a $20 check, since the risk level for that check would be low compared to the risk level for a $100,000 check. As noted above, a high risk transaction may be assigned dynamic authentication data that is current for only a relatively short time. Also, a payment to an entity in a foreign country that might have a less sophisticated banking system might be considered to have a higher risk compared to a payment to a domestic entity, and might therefore require more secure authentication data. For example, if a possible fraud is detected later on, it might be more difficult and/or more expensive to rectify the fraud in a foreign country than in the United States. Other considerations in determining which data to embed might include cost, time and space constraints. Also, quality constraints such as the consistency, age, accuracy, precision or volatility of certain types of data such as facial recognition, signatures, IP addresses or geolocation data should also be considered.

After certain types of data are excluded in step 706, authentication data appropriate to the check being issued is selected and obtained in step 708. For example, biometric or geolocation data may be retrieved. Then in step 710, the process may determine where in the check image to embed the authentication data. The authentication data is stored in the image in step 712. In some cases, fraudulent activity may be made more difficult by varying the location of the embedded data in the check image. For example, the exact location of the embedded data may be determined by an algorithm based upon the exact time the check is being created. The authentication data is then stored in the company's server in step 714. The data would generally be associated with the image of the check in the server.

The authentication data may also be recorded so that it may be used for future analyses, as discussed with reference to FIG. 8 below. This is a necessary predicate to step 706, to ensure that the selection of certain categories, groups or specific examples of data that should or should not be excluded is based upon current knowledge and experience. The future analyses may include, for example, examining past examples to determine which categories of data were most effective or more difficult to use for example, or even which categories did not work very well. Also, authentication data that has been used very many times might present a higher risk simply because of the number of times it has been used, since that might provide fraudulent actors with more opportunities or methods for determining the authentication methodology. Finally, the authentication data may be stored for future use so that it may be combined with the image of the check to recreate the check image with the embedded data, should that prove to be necessary, or for some other purpose.

In some cases, the process may include embedding extraneous data into the check image. Extraneous data is data that would not be used to authenticate the check, but is only included to make identifying the authentication data more difficult to discover.

Figure 8:
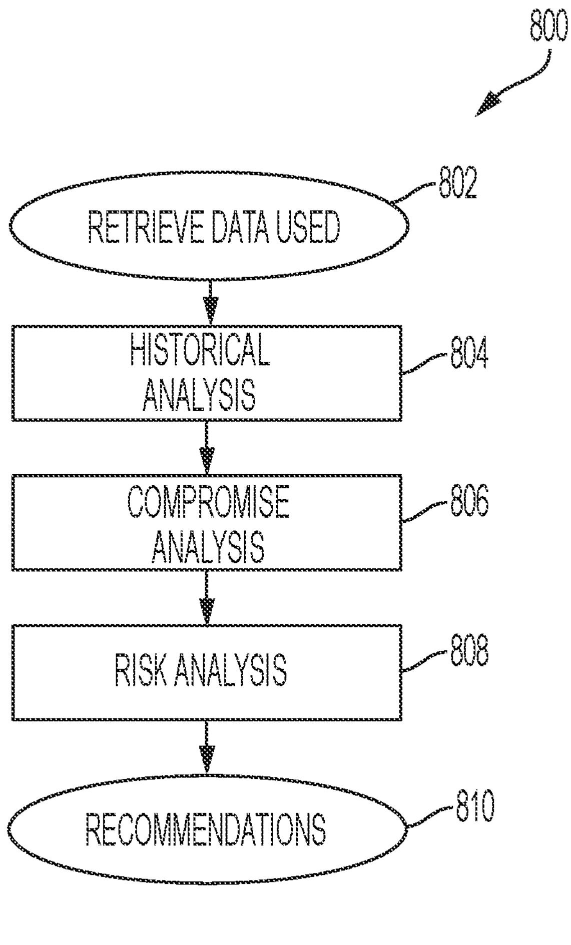
FIG. 8 is a flowchart outlining steps for analyzing the use of data for authenticating checks, according to an embodiment.

The flowchart 800 in FIG. 8 outlines steps that may be taken to analyze the authentication data that has been used to determine whether that data's status as reliable is still current and should continue to be used or whether it should be replaced. The analyses may be based on statistics or on some other methodology. The process starts with step 802, when the historical authentication data is retrieved. The process includes three different analyses. The first two analyses, which are listed as step 804 and step 806 in flowchart 800, may be performed in any order or in parallel. Historical analysis is performed in step 804. Historical analysis may be used to determine when that set of data was last used, how many times a set of data has been embedded in the company's checks, how often it has been used, which was the last ATM or who was the last teller the data was used with, how often it has been used compared to other data; and/or how often it has been used for a specific payee. Other types of historical data may also be used. Step 806 is a determination as to whether a particular set of data has been compromised, for example because a check with that data went awry, or because a check with that data had to be cancelled due to suspicious activity. The risk analyses performed in step 808 is generally based upon the analyses performed in step 804 and step 806, although they may include other considerations and/or be based on additional analyses. The process ends in step 810 possibly with recommendations to reclassify certain data as no longer reliable based upon the risk analyses performed in step 808.

Figure 9:
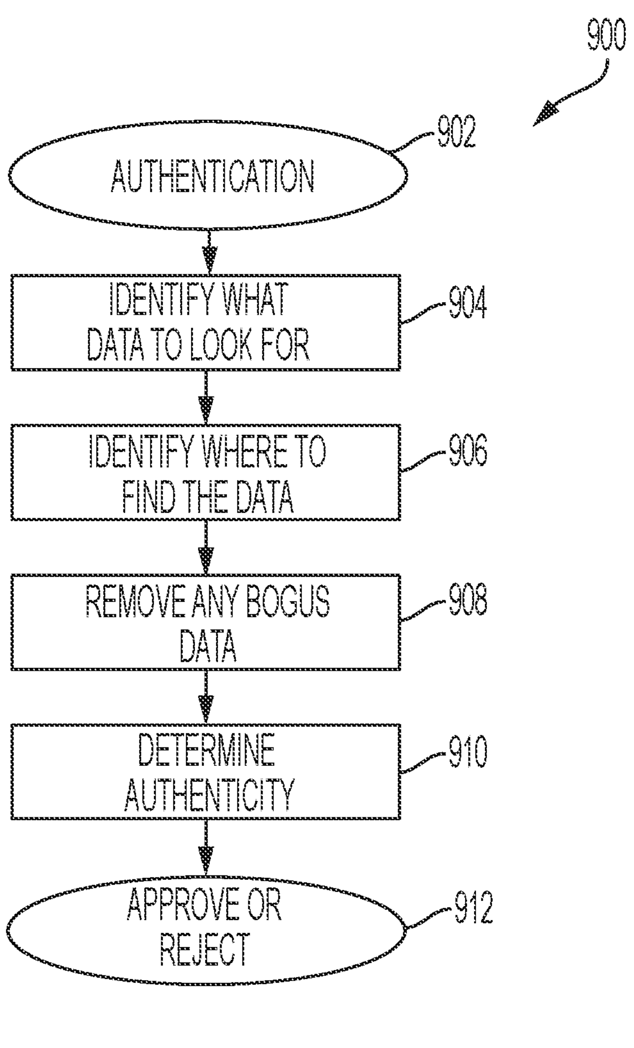
FIG. 9 is a flowchart showing steps that may be taken to authenticate a check or other object, according to an embodiment.

An exemplary flowchart 900 for authenticating checks is shown in FIG. 9. The authentication process starts with step 902 when a request for authentication is made. In step 904, the process identifies what kind of data to look for, such as digital data representing a geolocation, a photo, an image, a video, or other categories of possible authentication data. In step 906, the process determines where in the check image to look for the data. In step 908, the extraneous data is removed, and in step 910, the actual authentication data retrieved from the check is compared to the authentication data stored in the company's server to determine the authenticity of the check. In step 912, the check is then approved for payment or is rejected.

Although the descriptions above have been made primarily with respect to bank transactions, the disclosures herein are broadly applicable to authentication of documents that might be forged or duplicated for fraudulent purposes.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method for authenticating a document image comprising:

performing at least one of retrieving authentication data and generating authentication data to be embedded in the document image;

associating the authentication data to be embedded with the document image;

embedding the authentication data into the document image to produce a document image with embedded authentication data by using a time the document image is produced to determine a location in the document image at which to embed the authentication data;

embedding redundant data into the document image, the redundant data allowing reconstruction of the authentication data when the document image is corrupted;

embedding extraneous data into the document image, the extraneous data being omitted from the authentication data when determining the authenticity of the document image; and transmitting the document image with the embedded authentication data to a server that has an application that is configured to extract the embedded authentication data from the document image by using the time the document image is produced to determine a location of the authentication data in the document image with the embedded authentication data, compare the extracted embedded authentication data to stored data, and approve the document image if the extracted embedded authentication data matches the stored data.

2. The method of claim 1, wherein the document image is an image of a check, a scanner in an automated teller machine receives the check, and the automated teller machine embeds the authentication data into the image of the check.

3. The method of claim 1, wherein the embedded authentication data comprises at least one of a photo, facial recognition data, a media access control ID, audio data, a personal identification number, a personally identifying information, digits from an account number, and geolocation data.

4. The method of claim 1, wherein the authentication data comprises dynamic authentication data and the dynamic authentication data comprises at least one of a value of a stock index at a predetermined time, a price of a stock at a predetermined time, a score of a sports game, a temperature at a predetermined airport, and a time of a tide at a beach.

5. The method of claim 1, wherein the embedded authentication data is embedded into the document image at a first institution and the document image is transmitted from the first institution to a second institution.

* * * * *